Feb. 5, 1957    M. E. BOURNS    2,780,702
LINEAR MOTION RESISTOR
Filed Oct. 22, 1953
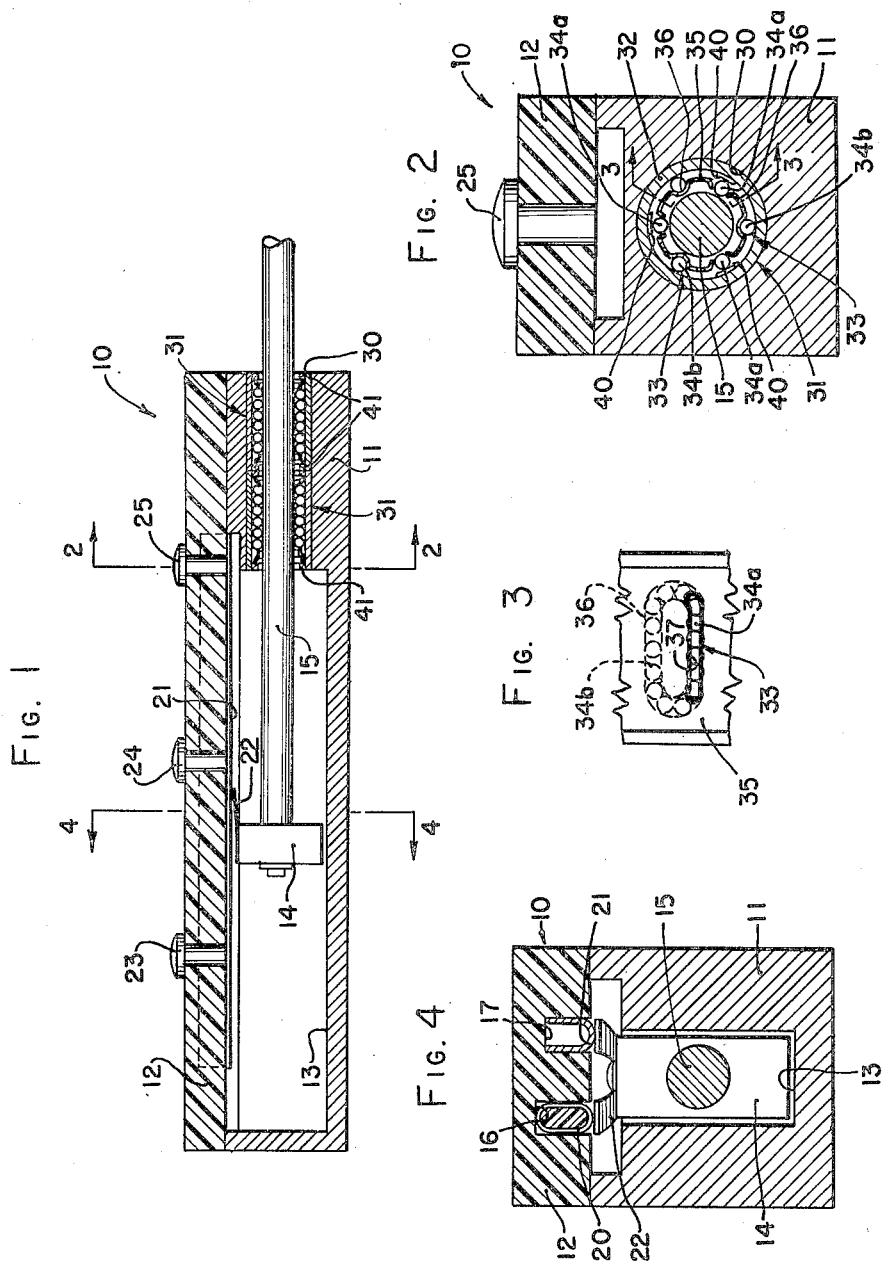
INVENTOR.
MARLAN E. BOURNS
BY Herbert E. Kidder
AGENT United States Patent Office 2,780,702
Patented Feb. 5, 1957

2,780,702

LINEAR MOTION RESISTOR

Marlan E. Bourns, Riverside, Calif.

Application October 22, 1953, Serial No. 387,598

2 Claims. (Cl. 201—62)

The present invention relates to variable resistors or potentiometers of the type embodying a contact member which is moved rectilinearly along the length of a resistance element. The primary object of the invention is to provide an instrument of the class described wherein the contact member is mounted on the end of a shaft that reciprocates with respect to the instrument housing, and wherein the shaft is supported for reciprocation by a new and unique arrangement having advantages that have heretofore been unattainable.

One of the advantages of the said arrangement is that it provides a relatively frictionless bearing for the shaft; while another advantage is that there is no clearance between the shaft and its bearing, and therefore no looseness or "shake" in the shaft that would allow the contact to diminish its pressure against the resistance element or to break contact therewith. This feature is particularly advantageous where the instrument is subjected to vibration or other accelerations, and one important object of the invention is to provide a linear motion resistor or potentiometer which is particularly designed to withstand vibrations and accelerations without producing electrical "noise."

Another object of the invention is to provide an instrument that is compact, simple to manufacture, inexpensive, extremely rugged and capable of a very great many cycles of operation without excessive bearing wear.

These objects are attained by means of a double ball bearing unit at one end of the instrument, which supports the shaft for substantially frictionless reciprocating movement. The ball bearing units each comprise a tubular raceway that encircles the shaft, and disposed within the space between the shaft and the raceway are ball bearings which are confined by a cage for rolling movement along lines parallel to the axis of the shaft. The ball bearings are arranged in groups spaced equidistantly around the circumference of the shaft, and each group includes a line of balls confined to a path parallel to the length of the shaft. The balls in the said line contact both the shaft and the inner surface of the raceway, and thereby support the shaft for relatively frictionless reciprocating movement.

The foregoing and other objects and advantages of the invention will become apparent to those skilled in the art upon consideration of the following detailed description of the preferred form thereof, reference being had to the accompanying drawing, wherein:

Figure 1 is a longitudinal vertical section through a potentiometer embodying the principles of my invention;

Figure 2 is an enlarged transverse section through the same at 2—2 in Figure 1;

Figure 3 is a fragmentary sectional view, taken at 3—3 in Figure 2; and

Figure 4 is a section taken at 4—4 in Figure 1.

In the drawings, the invention is embodied in a linear motion resistor or potentiometer, designated in its entirety by the reference numeral 10, and comprising a rectangular, box-like body 11 having a cover 12 on one side thereof. The body 11 is formed with a lengthwise extending, flat-sided cavity 13, and slidably disposed within the said cavity is a contact-carrying member 14. The member 14 is preferably in the form of a block which is mounted on the end of a shaft 15; the said shaft extending through one end of the body 11.

The cover 12 is preferably formed of non-conductive plastic, such as phenolic resin, and has two longitudinally extended channels 16 and 17 formed in the bottom side thereof. A resistance element 20 is disposed within the channel 16, while a conductor strip 21 is seated within the channel 17. Both the resistance element 20 and conductor strip 21 extend parallel to the line of travel of the contact member 14 and shaft 15, and are wiped by a contact member 22 mounted on the member 14. The two ends of the resistance element 20 are connected to terminals 23 and 24 in the lid 12 and the conductor strip 21 is connected to a third terminal 25.

The right-hand end of the body 11 is provided with a bore 30, and seated within the said bore are two longitudinally spaced ball-bearing units 31, mounted end to end, through which the shaft 15 extends and is slidably supported.

Each of the ball-bearing members 31 comprises an outer shell or tubular raceway 32 which contains three groups 33 of ball bearings spaced equidistantly around the circumference of the shaft. Each of the said groups comprises a generally elliptical circuit of balls, including a line of balls 34a extending parallel to the longitudinal axes of the shaft 15 and a second line of balls 34b extending parallel to the first line. The balls are confined by a generally tubular cage 35, which is formed with three outwardly facing channels 36, which form a track for the balls. A slot 37 in the bottom of the channel 36 containing the balls 34a permits the latter to bear on both the shaft 15 and raised portions 40 on the inner surface of the raceway 32. At both ends of the channel 36, the balls are returned from the line 34a to 34b, thereby permitting the balls to circulate freely in one direction.

The space between the outer surface of the shaft 15 and the inner surface of the raceway 32 is slightly greater than the diameter of the balls, and as the balls pass beyond the end of the raised portions 40, the balls become loose and have no further bearing contact between the opposed surfaces. Thus, the shaft 15 is supported solely by the three lines of balls 34a, which fit snugly between the shaft and the raceway, and provide rolling support for the shaft. Preferably, the ball-bearings are pre-loaded slightly so that there is no clearance, or "shake" between the shaft and the housing. Annular keepers 41 at both ends of the bearing unit confine the cage 35 and the balls to the interior of the shell 32.

The two ball-bearing units 31 provide longitudinally spaced areas of ball bearing support for the shaft 15, giving exceptionally frictionless support for the latter. At the same time, these linear ball bearings are extremely sturdy and rugged, and capable of withstanding many cycles of operation without excessive bearing wear. Since there are no clearances between the shaft and the body 11, the unit is capable of withstanding vibrations and accelerations without producing electrical "noise."

While I have shown and described in detail what I believe to be the preferred form of my invention, it is to be understood that various changes may be made in the shape and arrangement of the several parts without departing from the broad scope of the invention, as defined in the appended claims.

I claim:

1. A linear motion variable resistor comprising a body having a resistance element mounted thereon, a shaft disposed parallel to said resistance element, a contact member mounted on said shaft and making electrical contact with said resistance element, a raceway extending parallel to said shaft adjacent one end of said resistance element, a cage encircling said shaft in the space between said raceway and said shaft, said cage being formed with an endless channel comprising two courses extending parallel to the longitudinal axis of said shaft and interconnected at their ends, and a plurality of ball bearings disposed within said channel, said balls contacting both said raceway and said shaft along one of said courses, and being returned long the other of said courses from one end to the other.

2. A linear motion variable resistor comprising a body having a resistance element mounted thereon, a shaft disposed parallel to said resistance element, a contact member mounted on said shaft and making electrical contact with said resistance element, a tubular raceway mounted in said body adjacent one end of said resistance element and encircling said shaft, a cage encircling said shaft in the space between said raceway and said shaft, said cage being formed with a plurality of endless channels spaced equidistantly around said shaft, each channel comprising two courses extending parallel to the longitudinal axis of said shaft and interconnected at their ends, and a plurality of ball bearings disposed within said channel, said balls contacting both said raceway and said shaft along one of siad courses, and being returned along the other of said courses from one end to the other.

References Cited in the file of this patent
UNITED STATES PATENTS

| | | |
|---|---|---|
| 1,371,287 | Wirt | Mar. 15, 1921 |
| 2,390,547 | McCoy | Dec. 11, 1945 |
| 2,677,256 | Donandt | May 4, 1954 |